(12) United States Patent
Li

(10) Patent No.: US 10,765,947 B2
(45) Date of Patent: Sep. 8, 2020

(54) VISUAL DISPLAY METHOD FOR COMPENSATING SOUND INFORMATION, COMPUTER READABLE STORAGE MEDIUM AND ELECTRONIC DEVICE

(71) Applicant: NETEASE (HANGZHOU) NETWORK CO., LTD., Hangzhou (CN)

(72) Inventor: Xuemei Li, Hangzhou (CN)

(73) Assignee: NETEASE (HANGZHOU) NETWORK CO., LTD., Hangzhou, Zhejiang (CN)

( * ) Notice: Subject to any disclaimer, the term of this patent is extended or adjusted under 35 U.S.C. 154(b) by 0 days.

(21) Appl. No.: 16/168,147

(22) Filed: Oct. 23, 2018

(65) Prior Publication Data
US 2019/0126151 A1   May 2, 2019

(30) Foreign Application Priority Data

Oct. 27, 2017   (CN) .......................... 2017 1 1029698

(51) Int. Cl.
*A63F 13/5378*   (2014.01)
*A63F 13/54*   (2014.01)

(52) U.S. Cl.
CPC .......... *A63F 13/5378* (2014.09); *A63F 13/54* (2014.09)

(58) Field of Classification Search
None
See application file for complete search history.

(56) References Cited

U.S. PATENT DOCUMENTS

2003/0216177 A1\* 11/2003 Aonuma ................. A63F 13/10
                                                              463/32
2006/0040738 A1\* 2/2006 Okazaki ................. A63F 13/10
                                                              463/32
(Continued)

FOREIGN PATENT DOCUMENTS

CN          105103457 A       11/2015
CN          105224086 A        1/2016
(Continued)

OTHER PUBLICATIONS

Dictionary.com, Definition of Orientation, Dictionary.com , Mar. 19, 2016, p. 1, https://web.archive.org/web/20160319183037/https://www.dictionary.com/browse/orientation (Year: 2016).\*
(Continued)

*Primary Examiner* — Tramar Y Harper
(74) *Attorney, Agent, or Firm* — Yunling Ren

(57) ABSTRACT

The present disclosure provides a visual display method and apparatus for compensating sound information, a storage medium, and an electronic device, and relates to the field of human-computer interaction technology. The visual display method includes: providing a mini-map on a graphical user interface, and rendering a first graphic identifier on the mini-map, wherein the first graphic identifier is used to indicate a current position and orientation of a virtual object in a game scene; detecting a sound in a first preset range of the game scene, and when the sound in the first preset range of the game scene is detected, acquiring orientation information of a sound source of the sound; and generating a second graphic identifier corresponding to the sound at a corresponding position on the mini-map according to the orientation information of the sound source of the sound.

18 Claims, 10 Drawing Sheets

(56) References Cited

U.S. PATENT DOCUMENTS

| | | | | |
|---|---|---|---|---|
| 2007/0218965 A1* | 9/2007 | Tilston | ................... | A63F 13/10 |
| | | | | 463/2 |
| 2007/0218966 A1* | 9/2007 | Tilston | ................... | A63F 13/10 |
| | | | | 463/5 |
| 2007/0293313 A1* | 12/2007 | Shimizu | ................. | A63F 13/10 |
| | | | | 463/31 |
| 2008/0254882 A1* | 10/2008 | Watanabe | ............ | A63F 13/005 |
| | | | | 463/31 |
| 2009/0247250 A1* | 10/2009 | Kato | ..................... | A63F 13/10 |
| | | | | 463/2 |
| 2012/0075336 A1* | 3/2012 | Oda | .................... | G01C 21/367 |
| | | | | 345/629 |
| 2017/0340959 A1* | 11/2017 | Tang | .................... | G06F 3/0484 |
| 2018/0104591 A1* | 4/2018 | Fukuda | ................ | A63F 13/211 |
| 2018/0256977 A1* | 9/2018 | Wakasono | .......... | A63F 13/5378 |

FOREIGN PATENT DOCUMENTS

| | | |
|---|---|---|
| JP | H11272841 A | 10/1999 |
| JP | 2012073088 A | 4/2012 |
| JP | 2017055935 A | 3/2017 |

OTHER PUBLICATIONS

The CN2OA issued Dec. 5, 2018 by the CNIPA.
The CN 1OA issued on Aug. 24, 2018 by CNIPA.
"Surrounding recognizer" capable of visualizing sound.
The JP1OA issued Nov. 5, 2019 by the JPO.

* cited by examiner

VISUAL DISPLAY METHOD FOR COMPENSATING SOUND INFORMATION, COMPUTER READABLE STORAGE MEDIUM AND ELECTRONIC DEVICE

CROSS REFERENCE

This application is based upon and claims priority to Chinese Patent Application No. 201711029698.X, filed on Oct. 27, 2017, the entire contents thereof are incorporated herein by reference.

TECHNICAL FIELD

The present disclosure relates the field of human-computer interaction technology, and more particularly, to a visual display method and apparatus for compensating sound information, a storage medium and an electronic device.

BACKGROUND

In a conventional terminal (e.g. personal computer, PC) game, a user may determine a relative orientation of a sound source relative to a virtual object controlled by the user by determining the type of a sound in the game, and sound effects of the left and right channels. For example, the direction of an enemy may be determined by a change rule of footsteps, and for another example, a source of danger may be determined by a gunshot sound. Therefore, in the conventional terminal game, the user may quickly determine the environment in which the virtual object controlled by the user is located according to the sounds in the game, and respond quickly. In addition, the immersion is not easily interrupted due to the good application environment of the conventional terminal matched with an earphone or sound equipment with better sound effect, thus bringing a better experience to the user.

At present, with the popularity of handheld terminals, games are increasingly applied to the handheld terminals. However, compared with the conventional terminal, on the one hand, the application environment of the handheld terminal is relatively wide, and when the handheld terminal is applied in a noisy environment, it is difficult for the user to determine the environment in which the virtual object controlled by the user is located according to the sounds in the game, and the immersion is easily interrupted; on the other hand, most of handheld terminals may not indicate the directions of the sound sources well through the left and right channels.

It should be noted that the information disclosed in the above background section is only for enhancement of understanding of the background of the present disclosure and therefore may include other information that does not form the related art that is already known to those skilled in the art.

SUMMARY

The present disclosure aims at providing a visual display method and apparatus for compensating sound information, a storage medium and an electronic device.

According to an aspect of the present disclosure, there is provided a visual display method for compensating sound information, applied to a touch terminal capable of presenting a graphical user interface, the graphical user interface at least partially including a game scene, and at least part of a virtual object, wherein the method includes:

providing a mini-map on the graphical user interface, and rendering a first graphic identifier on the mini-map, wherein the first graphic identifier is used to indicate a current position and orientation of the virtual object in the game scene;

detecting a sound in a first preset range of the game scene, and when the sound in the first preset range of the game scene is detected, acquiring orientation information of a sound source of the sound; and generating a second graphic identifier corresponding to the sound at a corresponding position on the mini-map according to the orientation information of the sound source of the sound.

The present disclosure also discloses a computer readable storage medium storing a computer program thereon, which is applied to a touch terminal capable of presenting a graphical user interface, the graphical user interface at least partially including a game scene, and at least part of a virtual object, wherein the computer program, when being executed by a processor, performs:

providing a mini-map on the graphical user interface, and rendering a first graphic identifier on the mini-map, wherein the first graphic identifier is used to indicate a current position and orientation of the virtual object in the game scene;

detecting a sound in a first preset range of the game scene, and when the sound in the first preset range of the game scene is detected, acquiring orientation information of a sound source of the sound; and generating a second graphic identifier corresponding to the sound at a corresponding position on the mini-map according to the orientation information of the sound source of the sound.

The present disclosure also discloses an electronic device, including:

a processor; and a memory for storing executable instructions of the processor;

wherein, the processor is configured to perform the executable instructions to perform:

providing a mini-map on the graphical user interface, and rendering a first graphic identifier on the mini-map, wherein the first graphic identifier is used to indicate a current position and orientation of the virtual object in the game scene;

detecting a sound in a first preset range of the game scene, and when the sound in the first preset range of the game scene is detected, acquiring orientation information of a sound source of the sound; and generating a second graphic identifier corresponding to the sound at a corresponding position on the mini-map according to the orientation information of the sound source of the sound.

It is to be understood that both the foregoing general description and the following detailed description are exemplary and explanatory only and are not restrictive of the disclosure, as claimed.

BRIEF DESCRIPTION OF THE DRAWINGS

The above and other features and advantages of this disclosure will become more apparent through the detailed description about the exemplary embodiments with reference to the drawings. Obviously, the drawings in the following description are merely some embodiments of the present disclosure, and for those skilled in the art, other drawings may also be obtained based on these drawings without creative labor. In the drawing.

DETAILED DESCRIPTION

Figure 1:
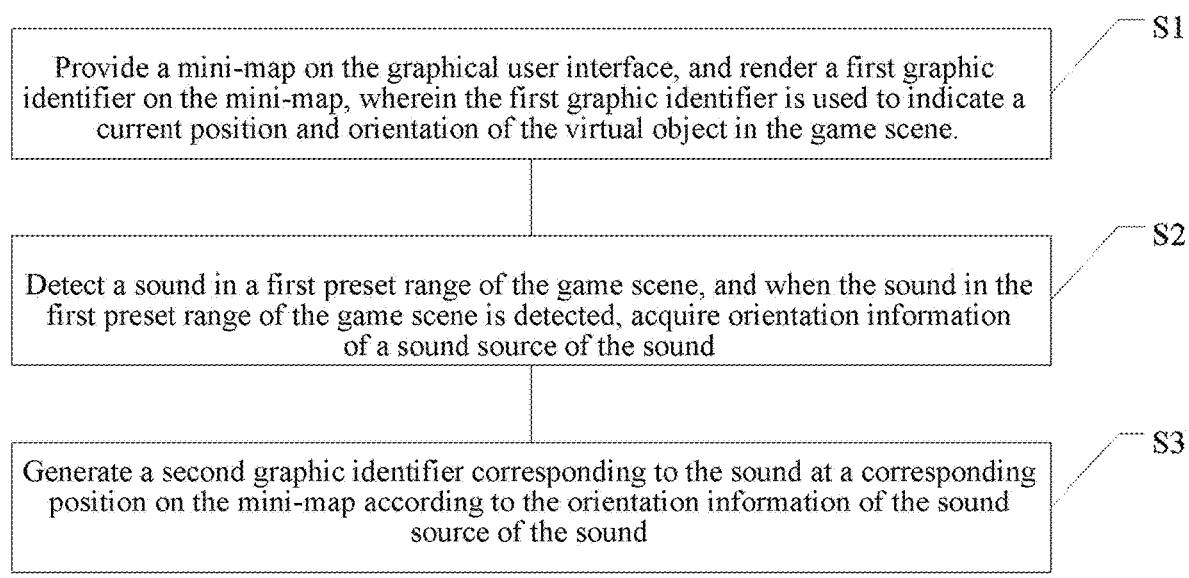
FIG. 1 is a flow chart of a visual display method for compensating sound information according to the present disclosure.

The exemplary embodiments will be described comprehensively with reference to the accompanying drawings. However, the exemplary embodiments may be implemented in many forms and should not be construed as being limited to the embodiments set forth herein; instead, these embodiments are provided so that this disclosure will be thorough and complete, and the concepts of the exemplary embodiments will be comprehensively conveyed to those skilled in the art. The same reference numerals in the drawings denote the same or similar parts, and the repeated description thereof will be omitted.

Furthermore, the described features, structures, or characteristics may be combined in one or more embodiments by using any suitable manner. In the following description, numerous specific details are set forth to provide full understanding of the embodiments of the present disclosure. However, those skilled in the art should appreciate that the technical solutions of the present disclosure may be practiced without one or more of the foregoing specific details, or other methods, constituent element, materials, devices, steps, etc. may be adopted. In other instances, well-known structures, methods, apparatuses, implementations, materials, or operations are not shown or described in detail to avoid obscuring various aspects of the present disclosure.

The block diagrams shown in the drawings are merely functional entities and do not have to correspond to physically separate entities. That is, these functional entities may be implemented in software form, or these functional entities or part of these function entities may be implemented in one or more software-hardened modules, or these function entities may be implemented in at least one of different networks, processor devices and microcontroller devices.

The exemplary embodiment of the present disclosure provides a visual display method for compensating sound information, applied to a touch terminal capable of presenting a graphical user interface, the graphical user interface at least partially including a game scene, and at least part of a virtual object. The touch terminal may be, for example, an electronic device having a touch screen, such as a mobile phone, a tablet, a game machine, or a PDA. A game application may control a touch screen of a touch terminal through an application program interface of the touch terminal to display a virtual object, a virtual joystick area including the virtual joystick, a virtual battle scene and a virtual natural environment, etc. The graphical user interface may either be performed on the entire or partial area of the touch screen, which is not specifically limited in the exemplary embodiments. The virtual object refers to a game character manipulated by a user, and is displayed in a partial or overall form of the game character on the graphical user interface. For example, in a first person perspective, the content of the graphical user interface is displayed by a master perspective of the user, which enhances the immersive experience of the user, and only a part of the game character, such as a hand or foot, may be presented on the graphical user interface; while in a third-person perspective, the game character may be presented on the graphical user interface as a whole, which reduces the manipulation difficulty and dizziness of the user, and emphasizes the visual sense of movement. The developer may determine the detailed display manner according to the game contents, which will not be limited in the present disclosure. Referring to FIG. 1, the visual display method for compensating sound information may include the following steps.

In step S1, a mini-map is provided on the graphical user interface, and a first graphic identifier is rendered on the mini-map, wherein the first graphic identifier is used to indicate a current position and orientation of the virtual object in the game scene.

In step S2, a sound in a first preset range of the game scene is detected, and when the sound in the first preset range of the game scene is detected, orientation information of a sound source of the sound is acquired.

In step S3, a second graphic identifier corresponding to the sound is generated at a corresponding position on the mini-map according to the orientation information of the sound source of the sound.

By providing the mini-map on the graphical user interface, and indicating the current position and orientation of the virtual object in the game scene and the orientation information of the sound source of the detected sound at the corresponding position on the mini-map via a graphic identifier, when the user turns off the game sound or is in a noisy environment, or the device lacks the condition of expressing the orientation of the sound source through the left and right voice channels, the direction of the sound source may be displayed in a compensation manner by the visual display of the corresponding graphic identifiers on the mini-map.

Hereinafter, with reference to FIGS. 1-6, the visual display method for compensating sound information of the present exemplary embodiment will be further described.

In step S1, a mini-map is provided on the graphical user interface, and a first graphic identifier is rendered on the mini-map, wherein the first graphic identifier is used to indicate a current position and orientation of the virtual object in the game scene.

Figure 2:
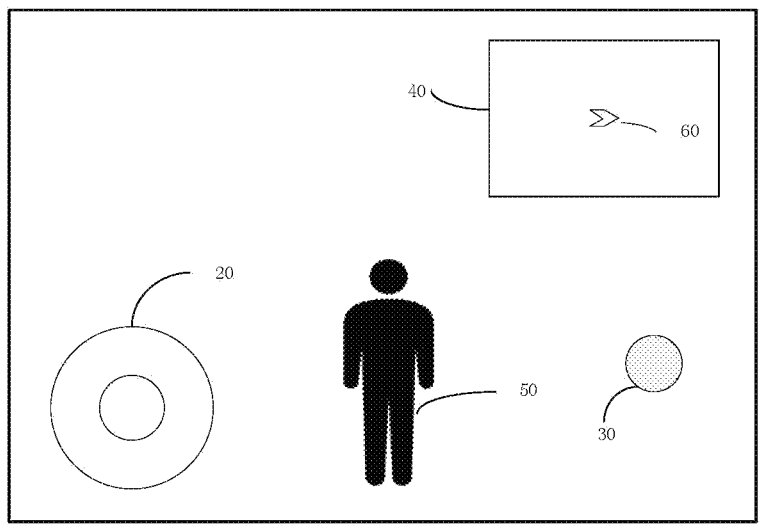
FIG. 2 is a schematic diagram of a graphical user interface involved in the visual display method for compensating sound information according to the present disclosure.

In the embodiment shown in FIG. 2, the graphical user interface includes a mobile manipulation area 20 for controlling a movement of the virtual object 50, a skill control 30 for controlling an issue of the skills. In this embodiment, a mini-map 40 is additionally provided to the graphical user interface, and a first graphic identifier 60 is rendered on the mini-map, wherein the first graphic identifier 60 is used to indicate the current position and orientation of the virtual object 50 in the game scene. As shown in the figure, the first graphic identifier 60 points to three o'clock direction, that is, the current orientation of the first graphic identifier 60 is east. The first graphic identifier 60 may adopt a triangle, an arrow or other suitable graph patterns, which is not limited in this present disclosure.

Figure 3:
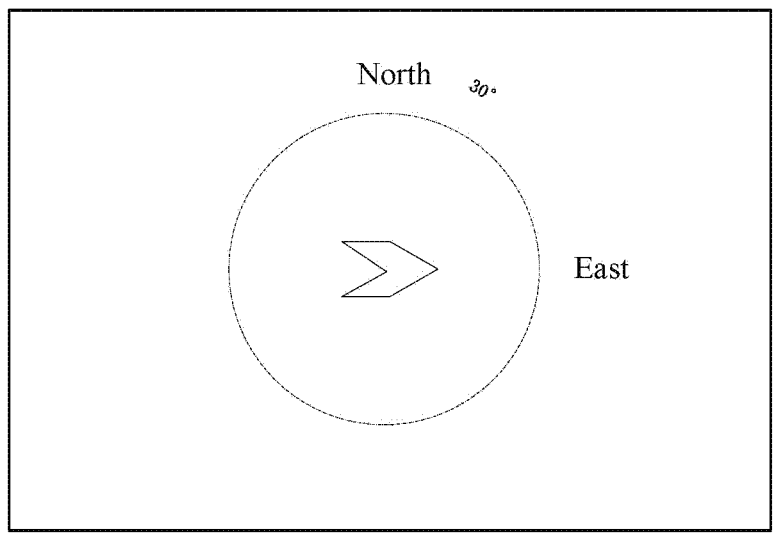
FIG. 3 is a schematic diagram of an orientation identifier according to an exemplary embodiment of the present disclosure.

In an embodiment, as shown in FIG. 3, individual orientations in the game scene may be marked by at least one of the text form (e.g., east, west, south, north) and azimuth scale (30°, 60°, 120°, etc.) on the mini-map. This type of orientation indicator may remind the user of the current approximate orientation. Due to the limited space of the screen of the mobile terminal, it may be difficult to display the full range of angles of 0-360 degrees on the mini-map, therefore it may be suggested to display details of partially focused scale on the graphical user interface, while the other part of scale may be displayed generally as the orientation description.

In step S2, a sound in a first preset range of the game scene is detected, and when the sound in the first preset range of the game scene is detected, orientation information of a sound source of the sound is acquired.

In the present exemplary embodiment, a size of the first preset range may be set by a developer according to game contents. In an embodiment, the first preset range is an area range determined by the current position of the virtual object in the game scene, e.g., the first preset range may be a range determined according to an auditory range of the virtual character, may also be an entire area of the game scene or an area of the game scene displayed on the graphical user interface, or the like. The developer may also set a setting rule of the first preset range according to game requirements, for example, multiple conditions may be adopted as the setting rule, for example, an area within a preset range and being not completely blocked by a sound absorbing obstacle may be set as the first preset range.

The sound in the first preset range may be detected by a detection module at a preset period, and the preset period may be set by the developer. However, in order to ensure the detection accuracy, it is unallowable to set the preset period to be too large.

In an embodiment, in order to provide more compensation and display more information, in addition to the orientation information, the following data may also be acquired simultaneously: a type of sound, a distance between the sound source and the virtual object, and the like, so that the type of the sound is acquired by a sound type acquisition module. The type of the sound may be a sound of a footstep, a conversation, a door opening, a gunshot, a fighting, etc., which is not specifically limited in this exemplary embodiment. Coordinates of the virtual object and coordinates of the sound source of the sound may be acquired, and the distance between the sound source of the sound and the virtual object and the orientation of the sound source of the sound relative to the virtual object may be calculated according to the coordinates of the virtual object and the coordinates of the sound source of the sound.

In step S3, a graphic identifier corresponding to the sound is generated at a corresponding position on the mini-map according to the orientation information of the sound.

When the sound is detected, the orientation information of the sound source of the sound is acquired. The orientation information may be a relative orientation of the sound source relative to the virtual object, or may be an orientation of the sound source in the game scene, or both of them are acquired at the same time. The developer may determine the orientation information according to the specific requirements of the game. On one hand, it is possible to determine the orientation information according to the information to be displayed of the game. For example, if only the relative orientation of the sound source relative to the virtual object should be indicated, then the relative orientation may be acquired; otherwise, the orientation of the sound source in the game scene may be acquired. On the other hand, it is possible to determine the orientation information based on the convenience of acquiring data from a game engine. If it is more convenient to acquire the relative orientation, then the relative orientation may be adopted. In addition, since the sound source and the virtual object are generally built up in the same coordinate system, the relative orientation and the orientation of the sound source in the scene may be mathematically converted to each other. Therefore, the developer may acquire one of the relative orientation and the orientation of the sound source in the scene, and then obtain the other by mathematical conversion. The orientation of the sound source may also be directly acquired by coordinates of the sound source, and the developer may also acquire the orientation information after obtaining and calculating the coordinate information.

In an embodiment, in step S3, the rendering the second graphic identifier corresponding to the sound at a corresponding position on the mini-map according to the orientation information of the sound source of the sound includes: determining relative orientation information of the sound source relative to the virtual object according to the orientation information; and displaying the second graphic identifier at a relative position relative to the first graphic identifier according to the relative orientation information.

Figure 4:
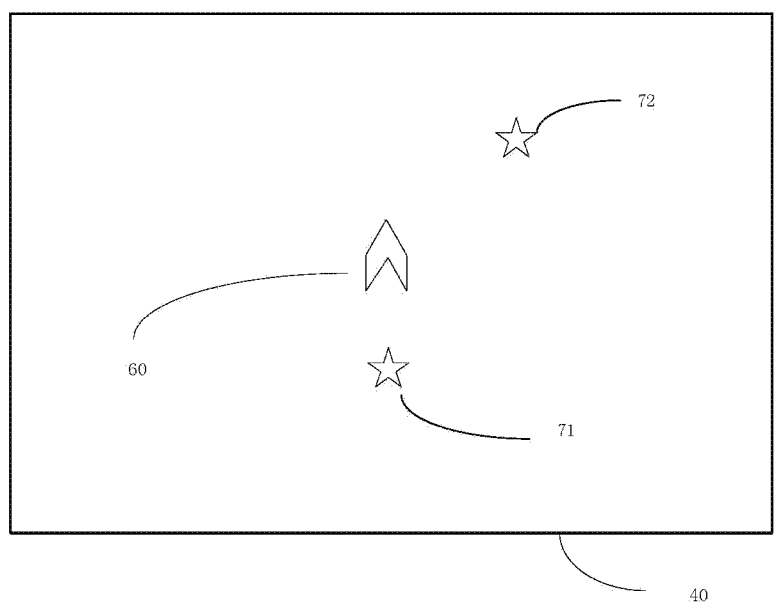
FIG. 4 is a schematic diagram of a second graphic identifier and related components according to an exemplary embodiment of the present disclosure.

As shown in FIG. 4, in order to display sound information in a compensation manner for the user, in the present embodiment, a first graphic identifier 60 is rendered on the mini-map 40, it may be seen that the orientation of the virtual object in the game scene is due north according to a pointing direction of the first graphic identifier 60, two sounds are detected within a preset range, and the relative orientation information of sound sources of the two sounds relative to the virtual object are acquired, wherein the relative orientation information of the sound sources of the first sound and the second sound relative to the virtual object are South 50 meters and Northeast 100 meters, respectively. That is, the relative orientation of the second graphic identifiers 71, 72 relative to the first graphical user identifier 60 (the current orientation is due north) are 180° and 45°, respectively, and the distance between the two second graphic identifiers 71, 72 and the first graphic identifier 60 are calculated according to the equal scale of the game scene and the mini-map. The second graphic identifiers 71 and 72 in FIG. 4 are marked in the form of five-pointed star on the mini-map, and the graphic identifier may also be a circle, a square, an arrow, etc., which may be set by the developer or the user, and the present disclosure is not limited thereto.

Figure 5A:
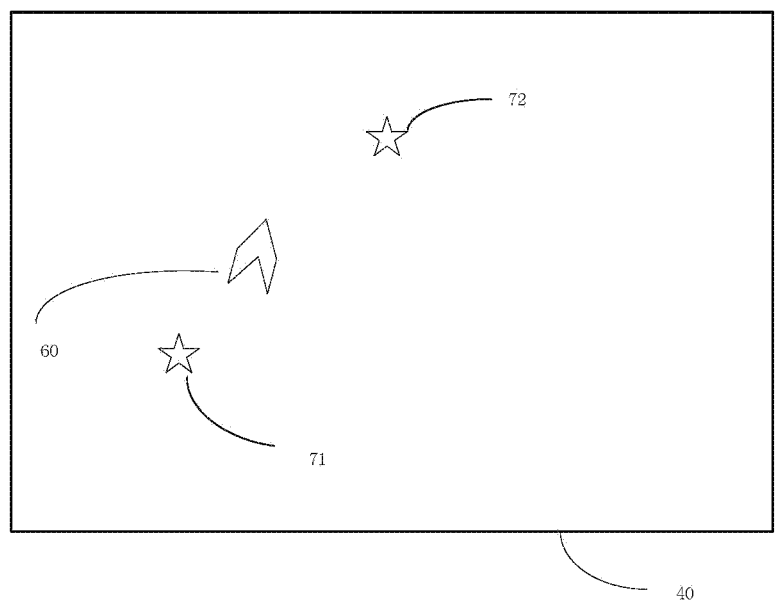
FIG. 5*a* and FIG. 5*b* are schematic diagrams of a second graphic identifier and related components, before and after moving the position of the virtual object, according to another exemplary embodiment of the present disclosure.
Figure 5B:
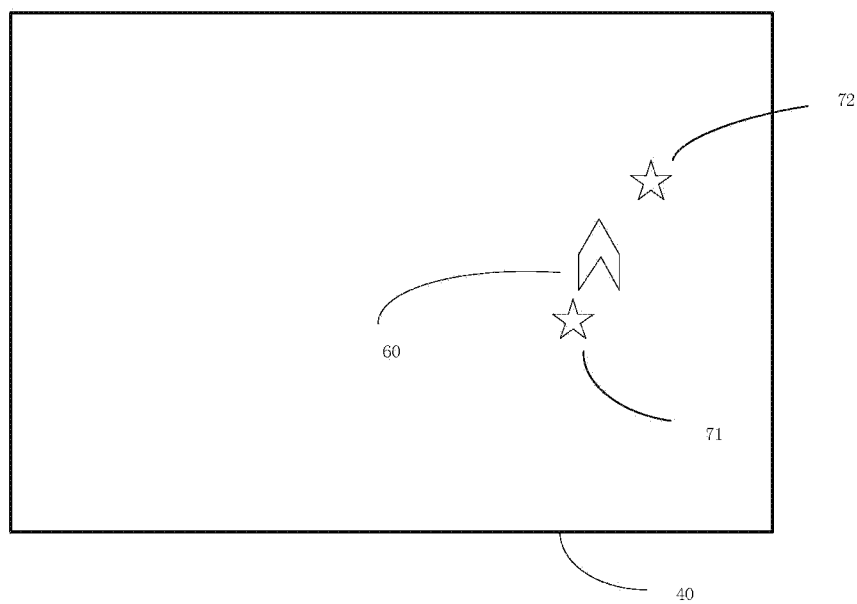

In the present exemplary embodiment, as shown in FIG. 4, the first graphic identifier may always be located at a center of the mini-map, and the game scene presented by the mini-map changes accordingly. In addition, the position of the first graphic identifier may also move with the movement of the virtual object controlled by the user, and the game scene presented by the mini-map is relatively fixed. Only when the virtual object moves beyond a range of the game scene currently displayed by the mini-map, part of the game scene presented by the mini-map changes accordingly. The developer or the user may make corresponding settings according to specific requirements, which is not limited by the present disclosure. For example, as shown in FIG. 5a, it is assumed that the virtual object is located at a position A in the game scene, a first graphic identifier 60 indicating the current position and orientation of the virtual object is displayed on the mini-map 40 accordingly and sound sources of two sounds within the preset range are detected, which are displayed as the second graphic identifiers 71, 72 respectively. When it is detected that the virtual object moves under a control of a touch operation by the user, as shown in FIG. 5b, the virtual object moves to a position B in the game scene, and the position and pointing direction of the first graphic identifier 60 change accordingly, the sound sources of the two sounds also moves, and the relative orientations of the second graphic identifier 71, 72 corresponding to the sound sources of the two sounds change accordingly.

Figure 6:
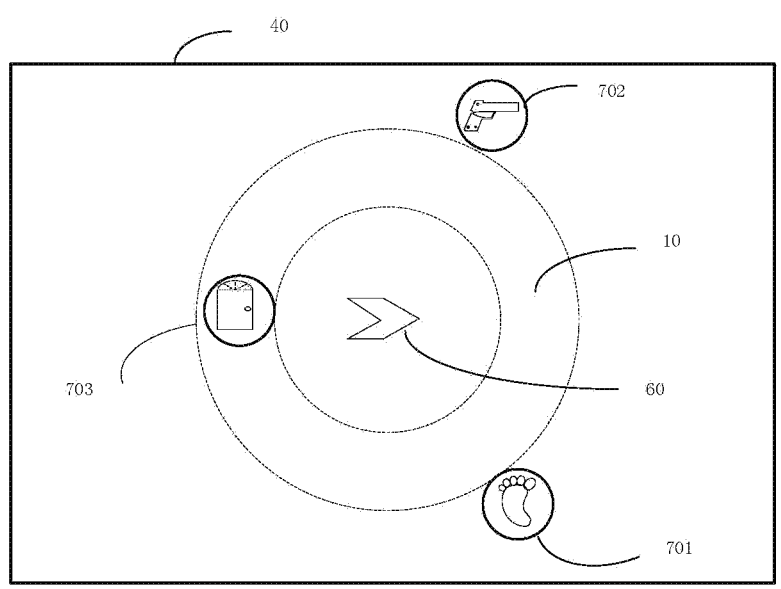
FIG. 6 is a schematic diagram of an annular area and related components according to another exemplary embodiment of the present disclosure.

As an embodiment, the displaying the second graphic identifier in the relative orientation relative to the first graphic identifier according to the relative orientation information includes: setting an annular area centered on the first graphic identifier, and displaying the second graphic identifier at a position corresponding to the annular area according to the relative orientation information. As shown in FIG. 6, an annular area 10 centered on the first graphic identifier 60 is set on the mini-map 40, and currently the first graphic identifier 60 faces east. According to the relative orientation information of the three sound sources relative to the virtual object, the distance between the first sound 703 and the virtual object is 100 m (i.e., an inner diameter r of the annular area), and the orientation of the first sound is due west. At the same time, two other sounds, i.e., a second sound and a third sound, are detected, a distance between both the second and third sounds and the virtual object is 200 meters (i.e., an external diameter R of the annular area), and the orientations of the second and third sounds are 30° from north to east and southeast, respectively. Then, second graphic identifiers 701, 702 corresponding to the second sound and the third sound are correspondingly displayed at positions of 30° and 135° on the outer ring of the annular area. The user may intuitively acquire the relative orientation information and the distance information of the sounds within the preset area in the game scene from the mini-map while experiencing the game. Since the graphical user interface of the game displays too many controls and contents, the annular area may be displayed in a dotted line on the mini-map as shown in FIG. 6, or not be displayed, which is set by the developer during development, and the present disclosure is not limited thereto.

As an embodiment, the method further includes: acquiring a type of the sound and selecting a corresponding ideographic graph from preset ideographic graphs according to the type of the sound, as the second graphic identifier of the sound. When there are a plurality of sound sources in the game scene, such as the second graphic identifiers 71, 72 in the embodiment shown in FIG. 4, the same graphic identifier may be used for all sounds without distinguishing the sound types, but this method is not conducive for the player to distinguish the sound types. Therefore, in an example, different graphic identifiers are adopted for different sounds. As the embodiment shown in FIG. 6, the sounds are divided into sound of footstep, gunshot and door opening, and different ideographic graphs are used to identify different sound types correspondingly. A sole ideographic graph 701 is used to indicate the sound of footstep, a pistol ideographic graph is used to indicate the sound of gunshot, and a door-like ideographic graph 703 is used to indicate the sound of door opening. The sound types and ideographic graphs and their corresponding relationship may be prestored in the game in advance. After acquiring the type of the sound, the corresponding ideographic graph may be selected by querying the preset content.

As an embodiment, as described above, in the case of acquiring the distance between the sound source and the virtual object, the display form of the corresponding graphic identifier may also be controlled according to the distance, which may include: controlling the display form of corresponding graphic identifier according to the distance, includes controlling at least one of a size, a color, a brightness, a transparency and a dynamic effect of the corresponding graphic identifier. As the embodiment shown in FIG. 7, the sizes of the second graphic identifiers 801, 802 respectively correspond to the distances.

In the present exemplary embodiment, the controlling the corresponding graphic identifier based on the distance between the sound source of the sound and the virtual object may include the following manners.

In a first manner, the display form of the second graphic identifier is controlled based on the distance between the sound source and the virtual object.

In the present exemplary embodiment, the transparency of the second graphic identifier is inversely related to the distance between the sound source and the virtual object, that is, the farther the distance between the sound source of the sound and the virtual object is, the higher the transparency of the second graphic identifier is; and the closer the distance between the sound source of the sound and the virtual object is, the lower the transparency of the second graphic identifier is. It should be noted that the transparency of the second graphic identifier is ranged from 100% to 0%. The second graphic identifier is completely transparent when the transparency of the second graphic identifier is 100%, and the graphic identifier is completely opaque when the transparency of the second graphic identifier is 0%.

In a second manner, the display form of the size of the second graphic identifier is controlled based on the distance between the sound source of the sound and the virtual object.

Figure 7:
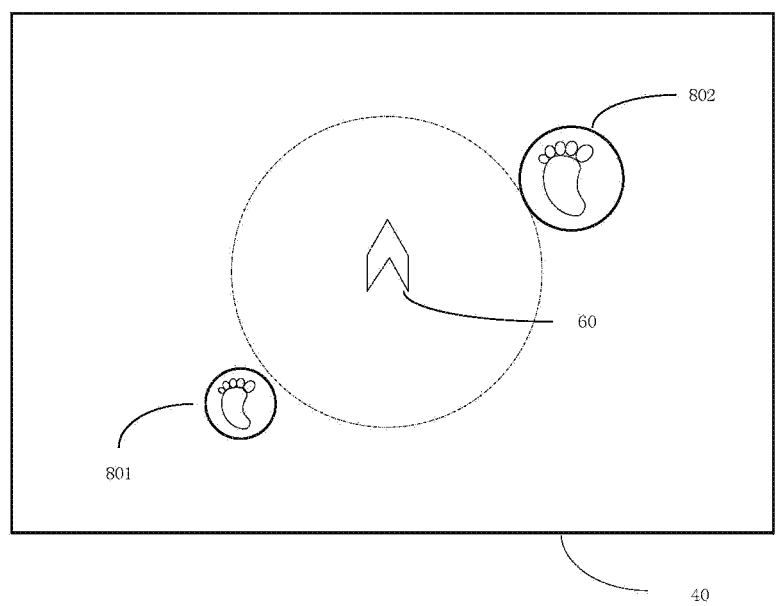
FIG. 7 is a schematic diagram of a second graphic identifier and related components according to another exemplary embodiment of the present disclosure.

In the present exemplary embodiment, the size of the second graphic identifier is inversely related to the distance between the sound source of the sound and the virtual object. That is, the farther the distance between the sound source of the sound and the virtual object is, the smaller the size of the second graphic identifier is; and the closer the distance between the sound of the source and the virtual object is, the larger the size of the second graphic identifier is. As shown in FIG. 7, for example, two sounds of footstep are detected near the virtual object, the second graphic identifiers are respectively corresponding to 801 and 802, and the sound source of the sound corresponding to the second graphic identifier 802 is closer to the virtual object, compared with the other sound source corresponding to the second graphic identifier 801.

In a third manner, a display form of the brightness of the second graphic identifier is controlled based on the distance between the sound source of the sound and the virtual object.

In the present exemplary embodiment, the brightness of the second graphic identifier is inversely related to the distance between the sound source of the sound and the virtual object. That is, the farther the distance between the sound source of the sound and the virtual object is, the lower the brightness of the second graphic identifier is; and the closer the distance between the sound source of the sound and the virtual object is, the higher the brightness of the second graphic identifier is.

It should be noted that, any one or two or three or four display forms of the transparency, the size, the brightness, and the dynamic effect of the corresponding second graphic identifier may be controlled according to the distance between the sound source of the sound and the virtual object.

As an embodiment, the display form of the second graphic identifier may be controlled according to the state of the sound source of the sound, which may include: controlling at least one of a size, a color, a brightness, a transparency and a dynamic effect of the corresponding second graphic identifier according to the state of the sound source of the sound. In the game scene, even though the types of the sound sources of the sounds are the same, their states may be different. For example, for a sound of gunshot of a certain type of firearm, when it is detected that a firearm of the virtual object controlled by a certain user is equipped with a silencer, the sound of gunshot of this firearm is weaker than that of the same type of firearm locating at the same position and without a silencer. Therefore, the display forms of the second graphic identifiers that are correspondingly reflected on the mini-map by the sound of gunshot are different. The specific implementation of different display forms of the second graphic identifier being associated with the states of the sound source of the sound are the same as the specific embodiment of different display forms of the second graphic identifier being associated with the distances of the sound source of the sound, which have been described above, and will not be repeated herein.

Figure 8:
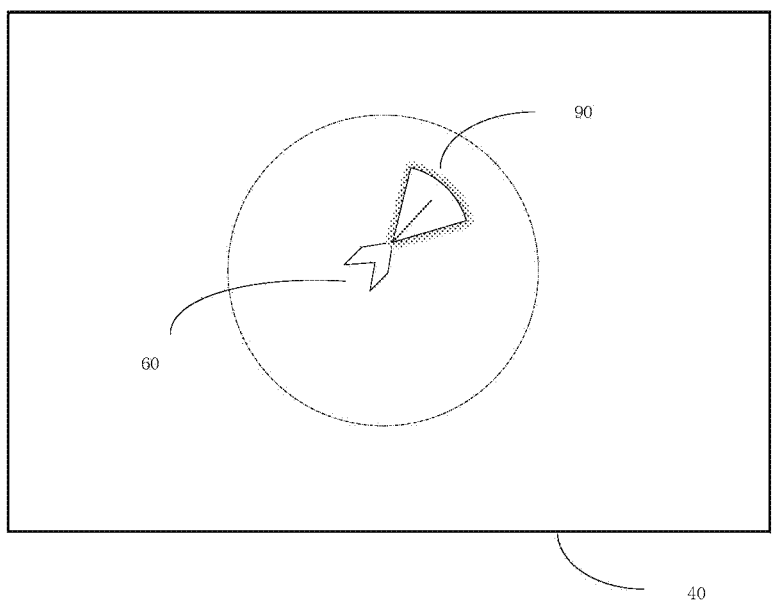
FIG. 8 is a schematic diagram of a third graphic identifier and related components according to another exemplary embodiment of the present disclosure.

As an embodiment, the method further includes: providing a third graphic identifier on the mini-map for indicating a vision field of the virtual object. As shown in FIG. 8, on the mini-map 40, a third graphic identifier 90 is rendered based on the position of the first graphic identifier 60 for indicating a vision field of the virtual object, so that the user may intuitively acquire the relative distance between the sound source of the sound and the virtual object, and predict the time when the sound source target of the sound enters the visual field, so as to make adequate preparations before the virtual object encounters the sound source target of the corresponding sound.

As an embodiment, the method further includes: setting a timer for recording a duration of a sound from beginning of the sound, determining whether the duration exceeds a preset time threshold, and if not, displaying the second graphic identifier corresponding to the sound. By setting the preset time threshold, the timeliness of the sound information may be further improved. For example, the preset time threshold is set to be 5 seconds, and if the sound source of a sound within the first preset range of the game scene is detected and then the second graphic identifier corresponding to the sound is displayed at a corresponding position on the mini-map, and the timer is turned on for timing at the same time, if the duration of the sound from beginning exceeds the preset time threshold of 5 seconds, the second graphic identifier corresponding to the sound source disappeared on the mini-map. In this way, the user may continuously acquire real-time updates of the sound information in the game scene, thereby ensuring the real-time and accuracy of the sound information within the preset range.

Moreover, the method further includes: when a plurality of the sounds that are located at the same orientation and do not exceed the preset time threshold are detected, displaying the second graphic identifier corresponding to the sound source of the sound that occurs at the latest. In the game, there may be sound source targets of a plurality of sounds located at the same orientation and not exceeding the preset time threshold, but it is difficult to display the second graphic identifiers corresponding to the sound sources of respective sounds due to the limited size of the mini-map. In this case, it is possible to display the second graphic identifier corresponding to the sound source of the sound that occurs at the latest on the mini-map.

Figure 9:
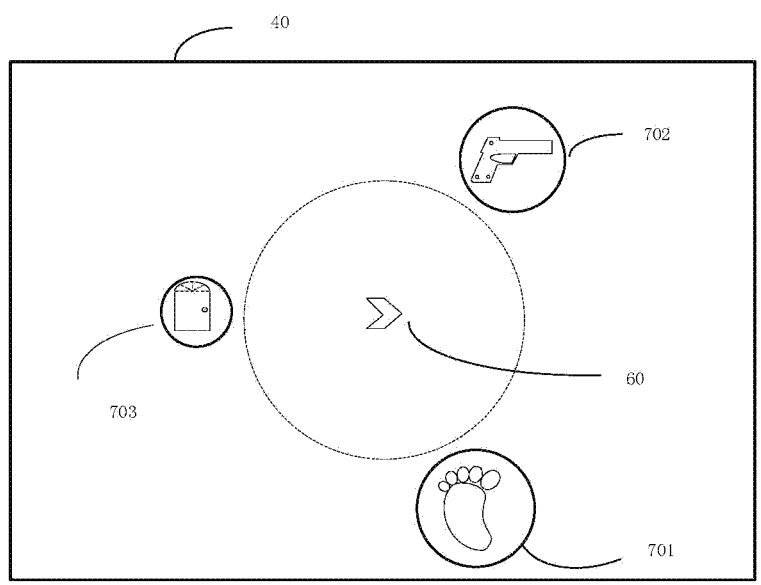
FIG. 9 is a schematic diagram of a second graphic identifier and related components according to another exemplary embodiment of the present disclosure.

Next, with reference to FIG. 9, an implementation manner of the present disclosure will be explained by a more specific embodiment. In the present embodiment, the visual display of the present disclosure will be explained by taking three sounds as an example. For example, the virtual object faces east in the game scene currently, and the three sounds are the first sound, the second sound, and the third sound respectively. The types of the three sounds are footstep sound, gunshot sound, and door opening sound respectively, distances between the sound sources of the three sounds and the virtual object are respectively 10 m, 20 m, and 30 m, and the orientation of the sound sources of the three sounds relative to the virtual object are shown in FIG. 9. The foot ideographic graphic 701 is used to indicate the footstep sound, the pistol ideographic graphic 702 is used to indicate the gun sound, and the door-like ideographic graphic 703 is used to indicate the door opening sound. On the basis of this, according to the distances, it is controlled that the sole ideographic graphic 701 is the largest, the pistol ideographic graphic 702 is the second, and the door-like ideographic graphic 703 is the smallest, and individual second graphic identifiers are respectively displayed at a corresponding position on the mini-map. As an embodiment, the player may control the movement of the virtual object by a touch operation, and the orientation and position of the virtual object changes correspondingly in the game scene. If the orientation of the virtual object changes, a corresponding pointing direction of the first graphic identifier changes accordingly.

In an exemplary embodiment of the present disclosure, there is provided a visual display method for compensating sound information, applied to a touch terminal capable of presenting a graphical user interface, the graphical user interface at least partially including a game scene, and at least part of a virtual object. The touch terminal may be an electronic device having a touch screen, such as a mobile phone, a tablet, a game machine, or a PDA. A game application may control a touch screen of a touch terminal through an application program interface of the touch terminal to display a virtual object, a virtual joystick area including the virtual joystick, a virtual battle scene and a virtual natural environment, etc. The graphical user interface may either be performed on the entire or partial area of the touch screen, which is not specifically limited in the exemplary embodiments. The virtual object refers to a game character manipulated by a user, and is displayed in a partial or overall form of the game character on the graphical user interface. For example, in a first person perspective, the content of the graphical user interface is displayed by a master perspective of the user, which enhances the immersive experience of the user, and only a part of the game character, such as a hand or foot, may be presented on the graphical user interface; while in a third-person perspective, the game character may be presented on the graphical user interface as a whole, which reduces the manipulation difficulty and dizziness of the user, and emphasizes the visual sense of movement. The developer may determine the detailed display manner according to the game contents, which will not be limited in the present disclosure.

In an exemplary embodiment of the present disclosure, there is provided a visual display apparatus for compensating sound information, applied to a touch terminal capable of presenting a graphical user interface, the graphical user interface at least partially including a game scene, and part of a virtual object, including:

rendering module, configured to provide a mini-map in the graphical user interface, and render a first graphic identifier on the mini-map, wherein the first graphic identifier is used to indicate a current position and orientation of the virtual object in the game scene;

a detection acquiring module, configured to detect a sound in a first preset range of the game scene, and when the sound in the first preset range of the game scene is detected, acquire orientation information of a sound source of the sound;

a control module, configured to generate a second graphic identifier corresponding to the sound at a corresponding position on the mini-map according to the orientation information of the sound source of the sound.

The specific details of various modules of the visual apparatuses for compensating sound information have been described above in detail in the corresponding visual display method for compensating sound information, and therefore will not be elaborated herein.

It should be noted that although several modules or units of apparatus for execution are mentioned in the detailed description above, such division is not mandatory. In fact, the features and functions of two or more of the modules or units described above may be embodied in one module or unit according to the embodiments of the present disclosure. Conversely, the features and functions of one module or unit described above may be further divided to be embodied by multiple modules or units.

In an exemplary embodiment of the present disclosure, there is provided an electronic device capable of implementing the above method.

Those skilled in the art will comprehend that various aspects of the present disclosure may be implemented as a system, a method or a program product. Therefore, various aspects of the present disclosure may be implemented specifically by the following forms, i.e., a complete hardware implementation, a complete software implementation (including firmware, microcode, etc.), or a combination of hardware and software, which may be collectively referred to as "circuit," "module," or "system."

The present disclosure also discloses an electronic device, including: a processor, and a memory for storing executable instructions of the processor;

wherein, the processor is configured to perform the executable instructions to perform any one of the above-mentioned visual display methods for compensating sound information.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the disclosure only be limited by the appended claims.

What is claimed is:

1. A visual display method for compensating sound information, applied to a touch terminal capable of presenting a graphical user interface, the graphical user interface at least partially comprising a game scene, and at least part of a virtual object, wherein the method comprises:

providing a mini-map on the graphical user interface, and rendering a first graphic identifier on the mini-map, wherein the first graphic identifier is used to indicate a current position and orientation of the virtual object in the game scene;

detecting a sound in a first preset range of the game scene, and when the sound in the first preset range of the game scene is detected, acquiring orientation information of a sound source of the sound; and generating a second graphic identifier corresponding to the sound at a corresponding position on the mini-map according to the orientation information of the sound source of the sound, wherein the method further comprises: setting a timer for recording a duration of the sound from beginning, determining whether the duration exceeds a preset time threshold, and if not, displaying the second graphic identifier corresponding to the sound, and wherein the method further comprises:

when a plurality of the sounds that are located at the same orientation and do not exceed the preset time threshold are detected, displaying the second graphic identifier corresponding to the sound that occurs at the latest.

2. The method according to claim 1, wherein the generating the second graphic identifier corresponding to the sound at the corresponding position on the mini-map according to the orientation information of the sound source of the sound comprises:

determining relative orientation information of the sound source relative to the virtual object according to the orientation information; and displaying the second graphic identifier at a relative orientation corresponding to the first graphic identifier according to the relative orientation information.

3. The method according to claim 2, wherein the displaying the second graphic identifier at the relative orientation corresponding to the first graphic identifier according to the relative orientation information comprises:

setting an annular area centered on the first graphic identifier, and displaying the second graphic identifier at a position corresponding to the annular area according to the relative orientation information.

4. The method according to claim 1, wherein the first preset range is an area range determined according to the current position of the virtual object in the game scene.

5. The method according to claim 1, wherein the method further comprises: acquiring at least one of a state of the sound source of the sound and a distance between the sound source of the sound and the virtual object, and controlling a display form of the second graphic identifier according to the at least one of the state and the distance.

6. The method according to claim 5, wherein the controlling the display form of the second graphic identifier according to the at least one of the state and the distance comprises: controlling at least one of a size, a color, a brightness, a transparency and a dynamic effect of the second graphic identifier according to the at least one of the state and the distance.

7. The method according to claim 1, wherein the method further comprises: acquiring a type of the sound; and selecting a corresponding ideographic graph from preset ideographic graphs according to the type of the sound, as the second graphic identifier corresponding to the sound.

8. The method according to claim 1, wherein the orientation information comprises: at least one of a relative orientation of the sound source relative to the virtual object and an orientation of the sound source in the game scene.

9. The method according to claim 1, wherein the method further comprises: providing a third graphical identifier for indicating a visual field of the virtual object on the mini-map.

10. A non-transitory computer readable storage medium storing a computer program thereon, which is applied to a touch terminal capable of presenting a graphical user interface, the graphical user interface at least partially comprising a game scene, and at least part of a virtual object, wherein the computer program, when being executed by a processor, performs:
providing a mini-map on the graphical user interface, and rendering a first graphic identifier on the mini-map, wherein the first graphic identifier is used to indicate a current position and orientation of the virtual object in the game scene;
detecting a sound in a first preset range of the game scene, and when the sound in the first preset range of the game scene is detected, acquiring orientation information of a sound source of the sound; and
generating a second graphic identifier corresponding to the sound at a corresponding position on the mini-map according to the orientation information of the sound source of the sound,
wherein the computer program, when being executed by the processor, further performs: setting a timer for recording a duration of the sound from beginning, determining whether the duration exceeds a preset time threshold, and if not, displaying the second graphic identifier corresponding to the sound, and
wherein the computer program, when being executed by the processor, further performs:
when a plurality of the sounds that are located at the same orientation and do not exceed the preset time threshold are detected, displaying the second graphic identifier corresponding to the sound that occurs at the latest.

11. An electronic device for compensating sound information, which is applied to a touch terminal capable of presenting a graphical user interface, the graphical user interface at least partially comprising a game scene, and at least part of a virtual object, wherein the electronic device comprises:
a processor; and
a memory for storing executable instructions of the processor;
wherein, the processor is configured to perform the executable instructions to perform:
providing a mini-map on the graphical user interface, and rendering a first graphic identifier on the mini-map, wherein the first graphic identifier is used to indicate a current position and orientation of the virtual object in the game scene;
detecting a sound in a first preset range of the game scene, and when the sound in the first preset range of the game scene is detected, acquiring orientation information of a sound source of the sound; and
generating a second graphic identifier corresponding to the sound at a corresponding position on the mini-map according to the orientation information of the sound source of the sound,
wherein the processor is further configured to perform: setting a timer for recording a duration of the sound from beginning, determining whether the duration exceeds a preset time threshold, and if not, displaying the second graphic identifier corresponding to the sound, and
wherein the processor is further configured to perform;
when a plurality of the sounds that are located at the same orientation and do not exceed the preset time threshold are detected, displaying the second graphic identifier corresponding to the sound that occurs at the latest.

12. The electronic device according to claim 11, wherein the processor is further configured to perform:
determining relative orientation information of the sound source relative to the virtual object according to the orientation information; and
displaying the second graphic identifier at a relative orientation corresponding to the first graphic identifier according to the relative orientation information.

13. The electronic device according to claim 12, wherein the processor is further configured to perform:
setting an annular area centered on the first graphic identifier, and displaying the second graphic identifier at a position corresponding to the annular area according to the relative orientation information.

14. The electronic device according to claim 11, wherein the first preset range is an area range determined according to the current position of the virtual object in the game scene.

15. The electronic device according to claim 11, wherein the processor is further configured to perform: acquiring at least one of a state of the sound source of the sound and a distance between the sound source of the sound and the virtual object, and controlling a display form of the second graphic identifier according to the at least one of the state and the distance.

16. The electronic device according to claim 15, wherein the processor is further configured to perform: controlling at least one of a size, a color, a brightness, a transparency and a dynamic effect of the second graphic identifier according to the at least one of the state and the distance.

17. The electronic device according to claim 11, wherein the processor is further configured to perform: acquiring a type of the sound; and selecting a corresponding ideographic graph from preset ideographic graphs according to the type of the sound, as the second graphic identifier corresponding to the sound.

18. The electronic device according to claim 11, wherein the orientation information comprises: at least one of a relative orientation of the sound source relative to the virtual object and an orientation of the sound source in the game scene.

* * * * *